(12) United States Patent
Ueyoko

(10) Patent No.: US 6,305,451 B1
(45) Date of Patent: Oct. 23, 2001

(54) HEAVY-DUTY RADIAL TIRE WITH SPECIFIED STEEL AMOUNT IN BELT PLIES

(75) Inventor: Kiyoshi Ueyoko, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/338,509

(22) Filed: Jun. 23, 1999

(30) Foreign Application Priority Data

Jun. 23, 1998 (JP) .................................................. 10-175993

(51) Int. Cl.[7] .............................. B60C 9/02; B60C 9/08; B60C 9/18; B60C 9/20; B60C 9/22

(52) U.S. Cl. ........................ 152/531; 152/526; 152/527; 152/532; 152/548; 152/556

(58) Field of Search ..................................... 152/526, 527, 152/548, 556, 532, 558, 560, 531

(56) References Cited

U.S. PATENT DOCUMENTS

H1333 * 7/1994 Helfer et al. ..................... 152/527 X

* cited by examiner

Primary Examiner—Adrienne C. Johnstone

(57) ABSTRACT

A heavy duty radial tire which comprises a tread portion, a pair of sidewall portions, a pair of bead portions, a carcass extending between the bead portions and composed of a single ply of steel cords arranged radially at an angle of from 70 to 90 degrees with respect to the tire equator, and a belt disposed radially outside the carcass in the tread portion and composed of two cross plies of steel cords laid parallel with each other at an angle of from 0 to 45 degrees with respect to the tire equator, wherein in at least the central part of the tread portion having 50% of the axial width of the belt, the total amount of steel in the belt plies being in the range of from 6 to 10 times the steel amount in the carcass ply, and the thickness of rubber between the radially adjacent belt cords and carcass cords is in the range of from 0.7 to 3.0 mm. Preferably, the two belt plies are made of substantially the same amount of steel in the central part.

3 Claims, 4 Drawing Sheets

HEAVY-DUTY RADIAL TIRE WITH SPECIFIED STEEL AMOUNT IN BELT PLIES

BACKGROUND OF THE INVENTION

The present invention relates to a radial tire for heavy duty vehicles, and more particularly to an improved reinforcing structure including a carcass and belt capable of reducing tire weight without deteriorating other tire performance characteristics, such as tire strength, durability and the like.

In general, radial tires for heavy-duty vehicles such as trucks, buses and the like are provided on the radially outside of a carcass with a steel breaker (A) composed of four plies A1–A4 of steel cords as shown in FIG. 6. As to the cord angles of the four plies, the plies are arranged so that the cords form a stiff triangular construction. Thus, the breaker is very rigid and the tire is provided with a required strength.

On the other hand, nowadays, in connection with environmental issues, especially air pollution control, resource saving, waste disposal and the like, automobiles tire manufacturers are required to reduce tire weight, materials and the like.

If the number of breaker plies is merely decreased, naturally, the rigidity and strength become insufficient, and the steering stability decreases. For example, if the breaker ply number is decreased to two, in order to obtain the above-mentioned required strength, it is necessary to increase the cord thickness and cord count in each ply, and the resultant breaker renders the tire weight heavier than ever against expectation. Furthermore, in such a breaker, as the rigidity difference between the breaker ply and the adjoining carcass ply becomes too large, separation failure is liable to occur and the high-speed durability decreases.

It is therefore, an object of the present invention to provide a heavy duty radial tire, in which the tire weight is reduced without causing a deterioration in the strength (plunger strength), steering stability, high-speed durability and the like.

SUMMARY OF THE INVENTION

According to the present invention, a heavy duty radial tire is provided which comprises a tread portion, a pair of sidewall portions, a pair of bead portions, a carcass composed of a single ply of steel cords arranged radially at an angle of from 70 to 90 degrees with respect to the tire equator and extending between the bead portions, and a belt disposed radially outside the carcass in the tread portion and composed of two cross plies of steel cords laid parallel with each other at an angle of from 0 to 45 degrees with respect to the tire equator, wherein in at least a central part of the tread portion having 50% of the axial width of the belt, the total amount of steel of the belt plies is in the range of from 6 to 10 times the amount of steel of the carcass ply, and the thickness of the rubber between the radially adjacent belt cords and carcass cords is in the range of from 0.7 to 3.0 mm.

Preferably, the two belt plies are of substantially the same steel amount.

BRIEF DESCRIPTION OF THE DRAWINGS

The present invention will now be described in detain in conjunction with the accompanying drawings, wherein.

DETAILED DESCRIPTION OF THE INVENTION

Figure 1:
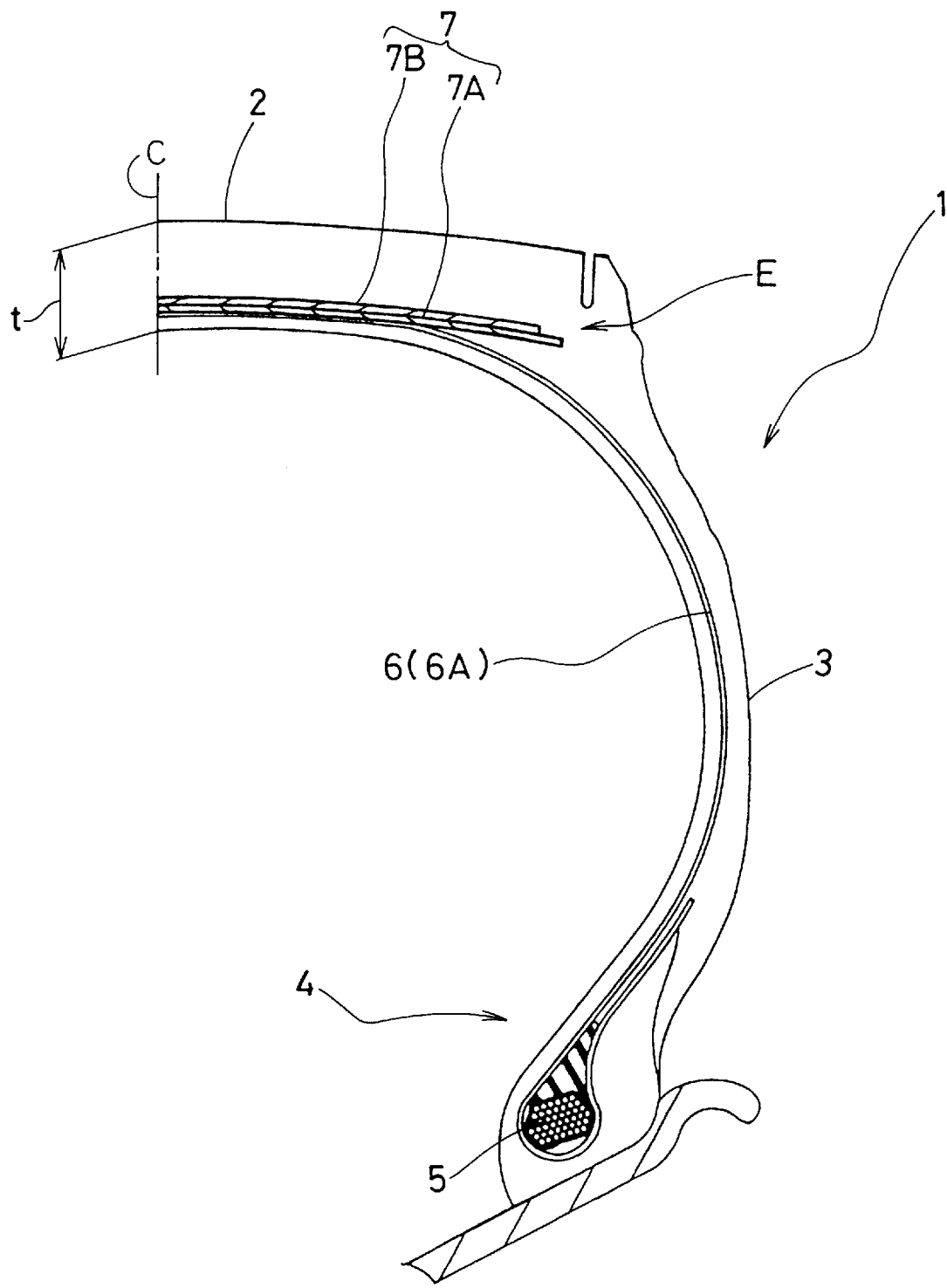
FIG. 1 is a cross sectional view of an embodiment of the present invention.
Figure 2:
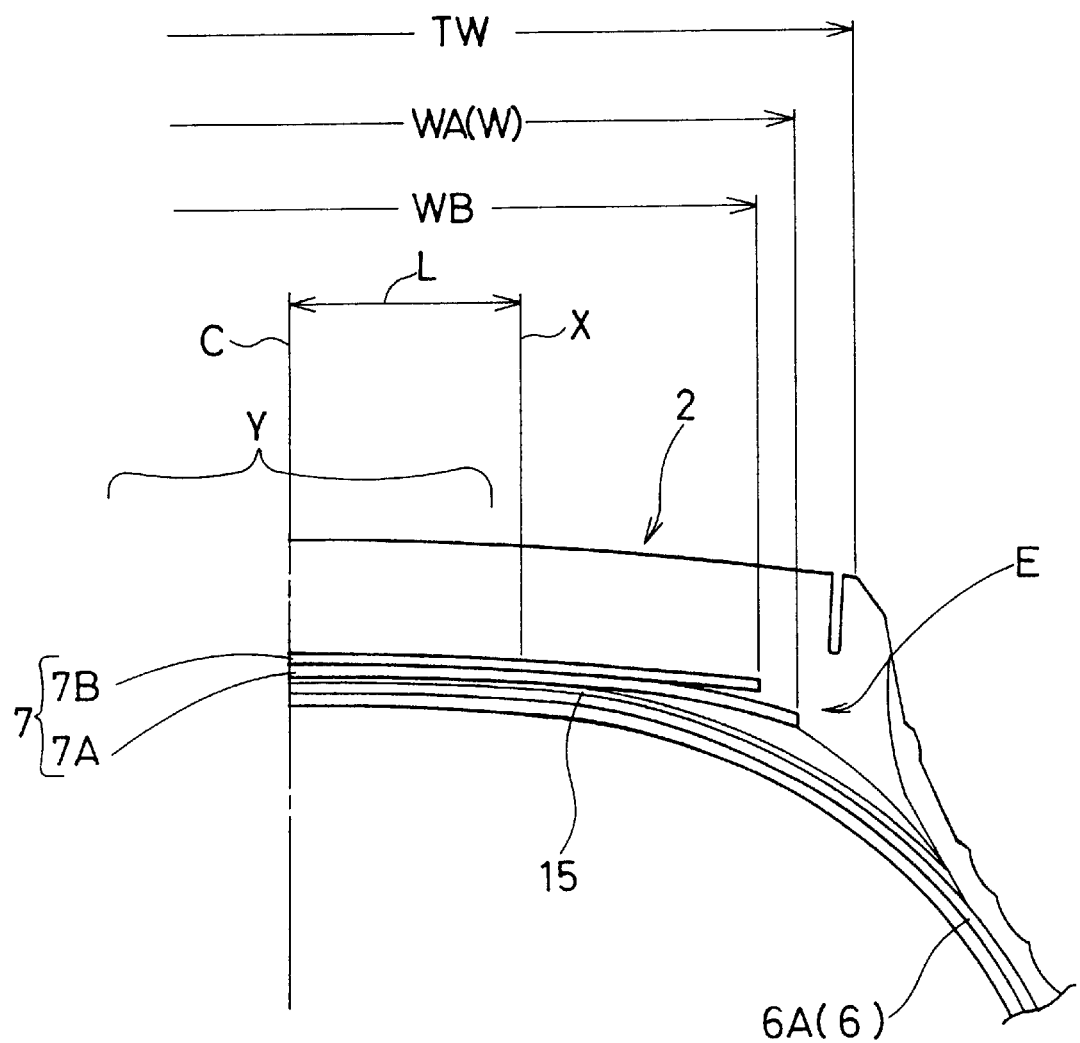
FIG. 2 is an enlarged cross sectional view showing the tread portion thereof.

In FIGS. 1 and 2, a heavy duty radial tire 1 according to the present invention comprises a tread portion 2, a pair of sidewall portions 3, a pair of bead portions 4 with a bead core 5 therein, a toroidal carcass 6 extending between the bead portions 4, and a belt 7 disposed radially outside the carcass 6 in the tread portion 2.

In this embodiment, the tire 1 is a belted radial tire for trucks and buses.

The carcass 6 consists of a single ply 6A extending between the bead portions 4 through the tread portion 2 and sidewall portions 3 and turned up around the bead core 5 in each of the bead portions 4 from the inside to outside of the tire. The carcass ply 6A is made of steel cords arranged radially at an angle of from 70 to 90 degrees (usually and in this example 90 degrees) with respect to the tire equator C.

The belt 7 is composed of a radially inner and outer plies 7A and 7B. The belt width W, which is defined as the maximum width WA of the wider ply, is set in the range of from 0.80 to 0.95 times (in this example 0.90 times) the tread width or the ground contacting width TW. The difference between the width WB of the narrow belt ply and the width WA of the wide belt ply is set in the range of from 4 to 10 mm in order to avoid stress concentration. In this example, the inner belt ply 7A is wider than the outer belt ply 7B.

Each of the belt plies 7A and 7B is made of steel cords laid parallel with each other at an angle of 0 to 45 degrees, preferably 10 to 30 degrees with respect to the tire equator C. The cord inclining directions of the two plies are reversed with respect to the tire equator C.

Figure 3:
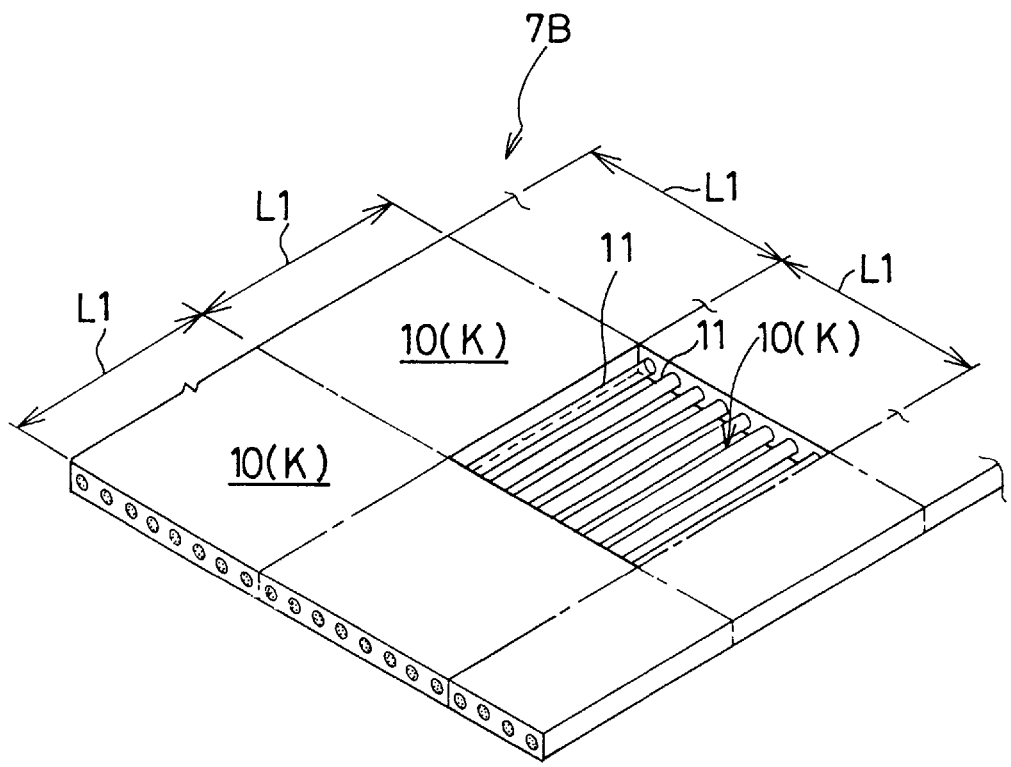
FIG. 3 is a schematic perspective view for explaining the steel amount of a ply.
Figure 4:
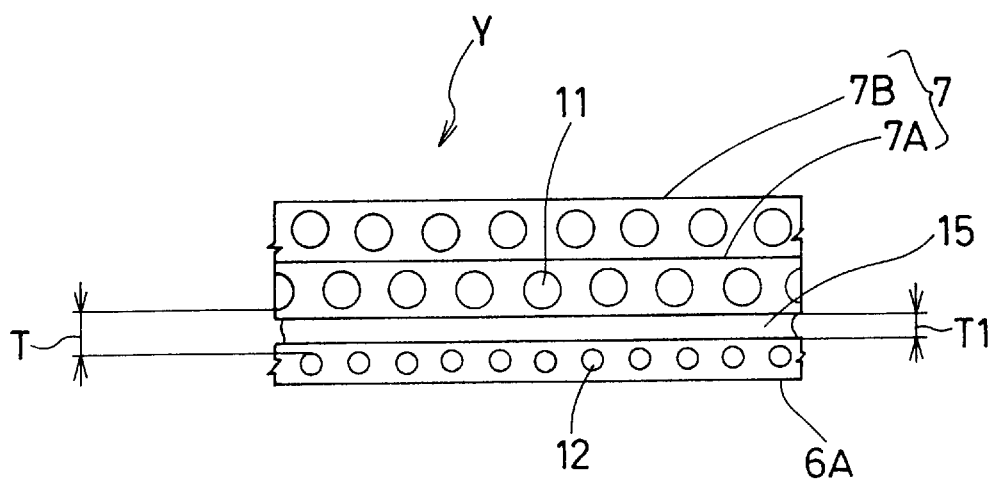
FIG. 4 is a schematic cross sectional view for explaining the rubber thickness between the carcass cords and the belt cords.

In at least a central tread region Y, the total MB (=MB1+MB2) of the steel amount MB1 of the inner belt ply 7A and the steel amount MB2 of the outer belt ply 7B is set in the range of from 6 to 10 times the steel amount MC of the carcass ply 6A. Here, the central tread region Y is defined as the central part of the tread portion having 50% of the belt width W. Basically, the "steel amount" of a ply is, as shown in FIG. 3, defined as a quotient V/K of the total volume V of the steel of the cords existing in a small unit 10 of the ply having a unit area K (=L1×L1) which is divided by this unit area K. When the "steel amount" is constant along the tire axial direction in the above-mentioned central tread region Y, this basic definition by a small unit 10 can be conveniently used. However, if the "steel amount" varies in the central tread region Y, a part corresponding to the whole region Y is used instead of a small unit 10.

Usually, the steel amount MC of the carcass ply 6A is set in the range of from 0.09 to 0.17 mm. In this case, the total steel amount MB of the two belt plies is in the range of about 0.54 to 1.7 mm, but preferably it is set in a narrower range of 0.76 to 1.27 mm.

Further, it is preferable that the two belt plies 7A and 7B are of substantially the same steel amount (MA=MB) and further have the same structure with respect to the cord structure, the cord count and the cord angle(numerically).

In the present invention, in order to enhance the plunger strength, the thickness T of rubber between the carcass cords 12 of the carcass ply 6A and the belt cords 11 of the radially adjacent inner belt ply 7A is increased to a value in the range of from 0.7 to 3.0 mm in at least the above-mentioned central tread region Y. Thereby, if a large force acts on a relatively narrow spot in the tread portion, the force can be dispersed and mitigated. Further, the carcass constricts the belt less, to allow the belt cords 11 to somewhat move each other. As a result, the plunger strength can be further improved.

Figure 5:
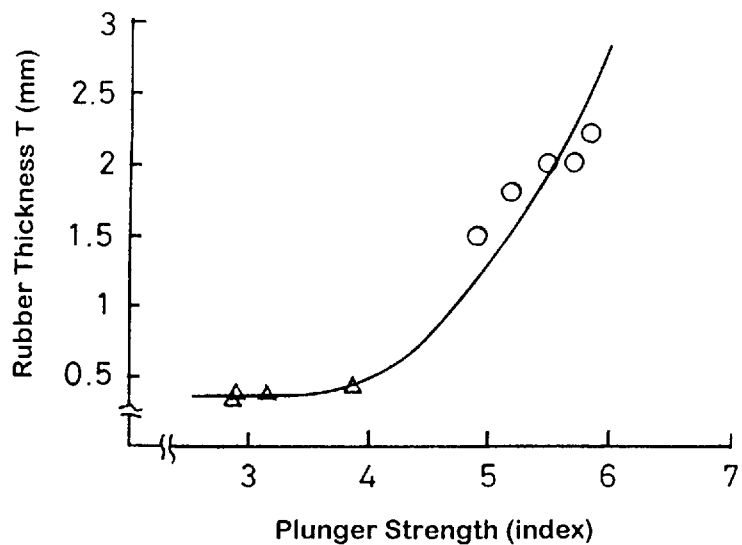
FIG. 5 is a diagram showing a relationship between the rubber thickness and the plunger strength.
Figure 6:
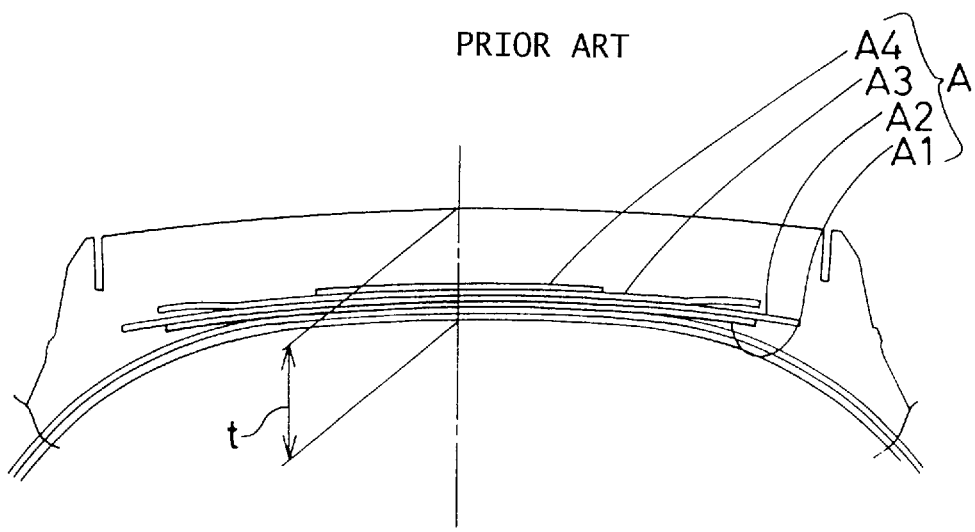
FIG. 6 is a cross sectional view showing a belt structure according to the prior art.

As shown in FIG. 5 which shows a relationship between the rubber thickness T and the plunger strength, when the rubber thickness T is less than 0.7 mm, the plunger strength is not improved. If the thickness T exceeds 3.0 mm, the tire weight and tire cost increase. If the steel amount MB is less than 6 times the steel amount MC, the plunger strength greatly decreases. If the steel amount MB is more than 10 times the steel amount MC, the tire weight increases.

In order to provide the above-mentioned rubber thickness T, it may be possible to increase the thickness of the topping rubber for the carcass ply 6A and/or the inner belt ply 7A. It is however, preferable to dispose a separate rubber layer 15 between the carcass ply 6A and the belt ply 7A. The thickness T1 thereof is usually set in the range of 1.0 mm plus/minus 0.5 mm. The hardness of this rubber layer 15 is adjusted to the substantially same value as the topping rubber if the carcass topping rubber and the belt topping rubber are of the same hardness. If they are different from each other, the mean value can be used. With respect to the tire manufacturing process, a strip of vulcanized rubber is preferably used as the rubber layer 15 during the building of a raw tire in order to maintain an accurate thickness. For example, the strip having a width corresponding to the above-mentioned central tread region Y at least is wound around the carcass crown and the belt is applied thereon.

Comparison Tests

Test tires of size 11R22.5 having the structure shown in FIG. 1 and the specifications shown in Table 1 were tested for the plunger strength, high-speed durability and tire weight.

Plunger Strength Test

According to Japanese Industrial Standard D4230, the breaking energy (plunger strength of the tread portion) was measured. The measured breaking energy is indicated in Table 1 by an index based on the conventional belt structure being 100. The larger the index, the higher the strength.

Wheel rim: 7.50×22.5 standard rim
Inner pressure: 700 kpa

High-speed Durability Test

Using a tire test drum, the tire was run until any visible damage was observed. The running speed was increased every three hours at a step of 10 km/h. In Table 1, the total running distance is indicated by an index based on the conventional belt structure being 100. The larger the index, the better the durability.

Initial speed: 80 km/h
Load: 4000 kgf
Wheel rim: 7.50×22.5 standard rim
Inner pressure: 850 kpa, Tire Weight The tire weight is indicated in Table 1 by an index based on the tire having the conventional belt structure being 100. The larger the index, the lighter the tire weight.

As described above, the heavy duty radial tires according to the present invention can be improved in the tire weight, high-speed durability, plunger strength, steering stability and the like, though the number of belt ply is decreased.

TABLE 1

| Tire | | Conv. | Ex. 1 | Ref. 1 | Ref. 2 | Ref. 3 | Ref. 4 |
|---|---|---|---|---|---|---|---|
| Carcass | | single ply | single ply | single ply | single ply | single ply | single ply |
| Cord angle | (deg.) | 90 | 90 | 90 | 90 | 90 | 90 |
| Cord structure | | 3 × 0.17 + 7 × 0.20 | 3 × 0.17 + 7 × 0.20 | 3 × 0.17 + 7 × 0.20 | 3 × 0.17 + 7 × 0.20 | 3 × 0.17 + 7 × 0.20 | 3 × 0.17 + 7 × 0.20 |
| Cord count N | (/5 cm) | 22 | 22 | 22 | 22 | 22 | 22 |
| Steel amount MC | (mm) | 0.128 | 0.128 | 0.128 | 0.128 | 0.128 | 0.128 |
| Rubber thickness T | (mm) | 0 | 2 | 2 | 2 | 0.6 | 3.1 |
| Belt | | 4 piles | 2 piles | 2 piles | 2 piles | 2 piles | 2 piles |
| Width WB | (mm) | 182 | 190 | 190 | 190 | 190 | 190 |
| First ply Cord angle | (deg.) | +67 | +18 | +18 | +18 | +18 | +18 |
| Cord structure | | 2 + 7 × 0.22 | 3 + 8 + 13 × 0.23 | 3 × 0.2 + 6 × 0.32 | 1 × 7/0.22 + 6 × 7/0.20 | 3 + 8 + 13 × 0.23 | 3 + 8 + 13 × 0.23 |
| Cord count N | (/5 cm) | 23 | 25 | 27 | 25 | 25 | 25 |
| Second ply Cord angle | (deg.) | +16 | −18 | −18 | −18 | −18 | −18 |
| Cord structure | | 3 × 0.20 + 6 × 0.32 | 3 + 8 + 13 × 0.23 | 3 + 0.2 + 6 × 0.32 | 1 × 7/0.22 + 6 × 7/0.20 | 3 + 8 + 13 × 0.23 | 3 + 8 + 13 × 0.23 |
| Cord count N | (/5 cm) | 27 | 25 | 27 | 25 | 25 | 25 |
| Third ply Cord angle | (deg.) | −16 | | | | | |
| Cord structure | | 3 × 0.20 + 6 × 0.32 | | | | | |
| Cord count N (/5 cm) | | 27 | | | | | |
| Fourth ply Cord anlge | (deg.) | −16 | | | | | |
| Cord structure | | 2 + 7 × 0.22 | | | | | |
| Cord count N | (/5 cm) | 23 | | | | | |
| Steel amount MB | (mm) | 0.952 | 1.016 | 0.632 | 1.656 | 1.016 | 1.016 |
| Steel amount ratio MB/MC | | 7.44 | 7.94 | 4.94 | 12.94 | 7.94 | 7.94 |
| Plunger strength | | 100 | 120 | 89 | 190 | 90 | 120 |
| High-speed durability | | 100 | 110 | 95 | 110 | 110 | 107 |
| Tire weight | | 100 | 96 | 95 | 130 | 95 | 100 |

What is claimed is:

1. A heavy duty radial tire comprising a tread portion, a pair of sidewall portions, a pair of bead portions, a carcass extending between the bead portions and composed of a single ply of steel cords arranged radially at an angle of from 70 to 90 degrees with respect to the tire equator, and a belt disposed radially outside the carcass in the tread portion and composed of two cross plies of steel cords laid parallel with each other at an angle of from 0 to 45 degrees with respect to the tire equator, in at least a central part of the tread portion having 50% of the axial width of the belt, the total of steel amounts of the belt plies being in the range of from 6 to 10 times a steel amount of the carcass ply, wherein the steel amount of each ply is defined as a quotient V/K of the total volume V of the steel of the cords existing in a unit area K of the ply which is divided by this unit area K, and the thickness of rubber between the radially adjacent belt cords and carcass cords being in the range of from 0.7 to 3.0 mm.

2. The heavy duty radial tire according to claim 1, wherein the two belt plies have substantially the same steel amount in said central part.

3. The heavy duty radial tire according to claim 2, wherein the two belt plies have substantially the same cord count, and the same cord structure and substantially the same inclination angles numerically.

\* \* \* \* \*